(12) United States Patent
Retzbach

(10) Patent No.: US 6,470,553 B1
(45) Date of Patent: Oct. 29, 2002

(54) METHOD FOR REMOVABLY CONNECTING TWO MEMBERS AND CONNECTION SYSTEMS FOR REALIZING THE SAME

(75) Inventor: Thomas Retzbach, Bonnigheim (DE)

(73) Assignee: Schunk GmbH & Co. KG Fabrik fur Spann- und Greifwerkzeuge (DE)

(*) Notice: Subject to any disclaimer, the term of this patent is extended or adjusted under 35 U.S.C. 154(b) by 0 days.

(21) Appl. No.: 09/485,932
(22) PCT Filed: Jun. 17, 1999
(86) PCT No.: PCT/EP99/04190
§ 371 (c)(1), (2), (4) Date: Feb. 18, 2000
(87) PCT Pub. No.: WO99/65643
PCT Pub. Date: Dec. 23, 1999

(30) Foreign Application Priority Data

Jun. 18, 1998 (DE) .......................................... 198 27 109
Aug. 1, 1998 (DE) .......................................... 198 34 739

(51) Int. Cl.⁷ ................................................. B23P 11/02
(52) U.S. Cl. ........................ 29/450; 29/453; 403/366; 403/372; 403/375
(58) Field of Search .................. 29/450, 453; 403/366, 403/372, 375

(56) References Cited

U.S. PATENT DOCUMENTS

| | | | | |
|---|---|---|---|---|
| 3,044,813 A | * | 7/1962 | Affeldt | 403/328 |
| 3,415,153 A | * | 12/1968 | Steiner | 411/512 |
| 3,438,660 A | * | 4/1969 | Steiner | 403/357 |
| 3,514,843 A | * | 6/1970 | Cernik | 29/559 |
| 3,779,659 A | * | 12/1973 | Habert | 403/372 |
| 4,408,383 A | * | 10/1983 | Nottingham et al. | 29/453 |
| 4,477,010 A | | 10/1984 | Dufft | 228/138 |
| 4,923,326 A | * | 5/1990 | Fietzke | 403/371 |
| 5,845,384 A | * | 12/1998 | Retzbach | 29/450 |

FOREIGN PATENT DOCUMENTS

| | | |
|---|---|---|
| CH | 461183 | 10/1968 |
| DE | 4008906 | 9/1991 |
| DE | 19521755 | 10/1996 |
| DE | 19624048 | 12/1997 |

* cited by examiner

Primary Examiner—I Cuda Rosenbaum
Assistant Examiner—Essama Omgba
(74) Attorney, Agent, or Firm—Liniak, Berenato, Longacre & White, LLC

(57) ABSTRACT

A method for creating a releasable joint between two components wherein one of the components is elastically deformed by radial compressive forces in such a way that one effective circumferential contour corresponds to the corresponding effective circumferential contour of the other component with a predefined clearance, and the two components are fitted together. After being fitted together, a compressive joint is created by the fact that the deformed component is elastically deformed back by reducing or discontinuing the radial compressive forces. What is used as the elastically deformable component is a hollow body which has multiple cavities in its wall, and the radial compressive forces are exerted on the inner or outer contour of the hollow body located opposite the effective circumferential contour in such a way that their working lines, considered in the circumferential direction, run approximately centeredly through the cavities.

10 Claims, 4 Drawing Sheets

_US 6,470,553 B1_

METHOD FOR REMOVABLY CONNECTING TWO MEMBERS AND CONNECTION SYSTEMS FOR REALIZING THE SAME

FIELD OF THE INVENTION

The present invention concerns a method for creating a releasable joint between two components, in which one of the components is elastically deformed by radial compressive forces in such a way that one effective circumferential contour corresponds to the corresponding effective circumferential contour of the other component with a predefined clearance, so that the two components can be inserted into one another; and in which, after the two components have been fitted together, a compressive joint is created by the fact that the deformed component is elastically deformed back by reducing or discontinuing the radial compressive force.

BACKGROUND OF THE INVENTION

Methods of this kind for creating a frictionally engaged joint between two components are known from DE 195 21 755 C1 and from DE 196 24 048 A1. With these methods, a polygonal or oval component is elastically brought in identical fashion into a round shape by the application of radial compressive forces, so that a round shaft can be installed while the radial compressive forces are maintained. When the radial forces are then reduced or discontinued, the deformed component springs back into its original oval or polygonal shape, so that the shaft is immobilized therein by way of a press fit. This manner of joining two components has proven entirely successful in practice. It is nevertheless often considered disadvantageous that extremely large compressive forces are necessary if the component to be deformed possess large wall thicknesses, and the deformations which occur can then also not be managed precisely, i.e. are to some extent undefined.

SUMMARY OF THE INVENTION

It is therefore the object of the invention to describe a method and a joining system of the kind cited initially with which these disadvantages can be overcome, i.e. which allow the easy utilization of components to be deformed that have a large wall thickness.

According to the present invention, this object is achieved in that what is used as the elastically deformable component is a hollow body that has multiple cavities in its wall; and that the radial compressive forces are exerted on the inner or outer contour of the hollow body located opposite the effective circumferential contour in such a way that their working lines, considered in the circumferential direction, run approximately centeredly through the cavities. It has been found that the cavities exhibit the deformation behavior of thin-walled components, and can be deformed with comparable energy expenditure, if their cross section is weakened in accordance with the present invention by cavities, and the radial deformation forces act in the region of the cavities.

According to an embodiment of the invention, provision is made for the hollow body used to be one whose cavities are closed toward the effective circumferential contour, the effective circumferential contour having, in the undeformed state, circumferential segments lying inside and outside the effective circumferential contour of the other component. For example, if a shaft is to be clamped from outside, the hollow body used is one whose cavities are provided in the region of those circumferential segments which, in the unclamped state, lie outside the circumferential contour of the shaft that is to be clamped, and the radial compressive forces are exerted on the cavities from outside. The result is that the regions of the hollow body lying between the force application points—i.e. those circumferential segments that lie, in the unclamped state, inside the circumferential contour of the shaft—are pushed outward, so that the shaft can be inserted into the hollow body.

If the hollow body is to be used to clamp a hollow shaft on the outside, the hollow body used is one whose cavities are provided in the region of those circumferential segments that lie, in the unclamped state, inside the circumferential contour of the other component, and the radial compressive forces are applied onto the hollow body from the inner side. The result of this is that the circumferential segments placed between the force application points, are drawn inwardly so that the hollow body can be inserted into the hollow shaft.

A further embodiment provides for using, as the elastically deformable component, a hollow body that has multiple recesses extending in the circumferential direction which, viewed in the circumferential direction, are open in their center region toward the effective circumferential contour that comes into contact with the other component; and that the radial compressive forces are exerted on the inner or outer contour of the hollow body that lies opposite the effective circumferential contour in such a way that their working lines lie inside the opening regions of the recesses toward the effective circumferential contour, so that the body segments formed between the, opening regions are moved by the deformation substantially radially into the region of the recesses in this case, if radial compressive forces are exerted on the hollow body in the regions where the recesses open toward the effective circumferential contour, the result is that the body segments lying therebetween, at which the effective circumferential contour is constituted, are pulled radially into the region of the recesses, thereby achieving the clearance necessary for fitting together the two components.

For example, if a shaft is to be clamped from outside, what is used is a hollow body in the form, for example, of an annular element in which the recesses open toward the inner circumference; and radial compressive forces are exerted on the hollow body from outside. The result of this is that the regions of the hollow body lying between the force application points are pushed outward, thus also causing the body segments to be moved outward substantially without deformation, so that the shaft can be inserted into the hollow body. The recesses—which for example can be introduced into the hollow body by way of an electrodischarge machining operation—must possess a width in the radial direction such that the body segments have sufficient room to deflect, and can be configured, for example, in the form of radial slits or slots.

Because the effective circumferential contour of the deformable component is substantially the same in the loaded and unloaded states, particular machining operations in the manufacture of said component are not necessary. For clamping a round shaft, for example, all that is necessary is to create on the hollow body a round inner contour whose radius for producing the press fit is somewhat smaller than that of the shaft, i.e. in the unclamped state the inner contour lies completely inside the circumferential contour of the shaft that is to be clamped.

If a [hollow shaft is to be clamped externally with the] hollow body is to be clamped inside a hollow shaft, the recesses open toward the outer circumference of the hollow body and the radial compressive forces are applied onto the hollow body from the inner side. The result of this is that the body segments that are formed between the opening regions are pulled inward into the region of the recesses, so that the hollow body can be inserted into the hollow shaft. In this case as well, the radial movement of the body segments takes place substantially without deformation of the external effective circumferential contour, which correspondingly has, in the unclamped state, a circular shape whose diameter is somewhat greater than the inside diameter of the hollow shaft.

The cavities should extend over a substantial circumferential region of the hollow body. It has proven to be advantageous if they extend altogether over at least 2000, in particular over approximately 2800 to 3000, so that they are separated from one another only by narrow web regions. According to a preferred embodiment, a total of three recesses are provided in the hollow body, each extending over a circumferential region of 80 to 1000; preferably they are arranged uniformly distributed over the circumference.

Regarding further advantageous embodiments of the invention, reference is made to the dependent claims and to the description below of an exemplary embodiment referring to the appended drawings, in which:

DETAILED DESCRIPTION

Figure 1:
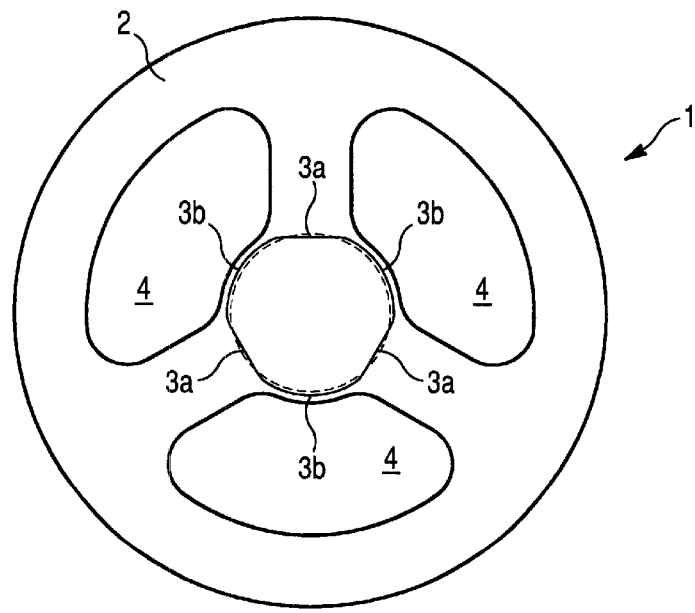
FIG. 1 shows a first embodiment of a joining system according to the present invention for clamping a shaft, in the clamped state.
Figure 2:
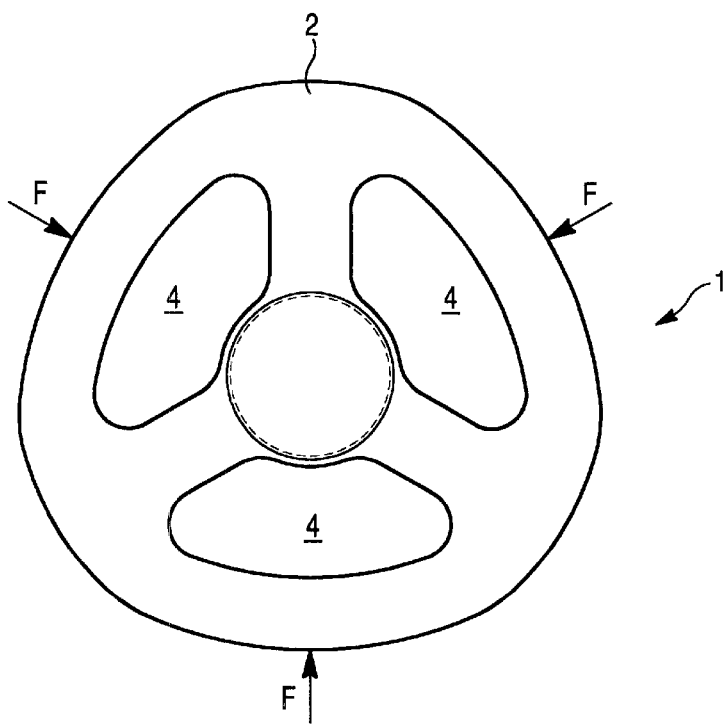
FIG. 2 shows the joining system of FIG. 1 in the fitting and/or released state.

FIGS. 1 and 2 depict an embodiment of a joining system 1 configured according to the present invention. This joining system 1 comprises a round shaft (not depicted) and a hollow body, in the form of an annular element 2, to be fastened onto the shaft. Annular element 2 has a polygonal inner contour and an approximately circular outer contour, the outer contour on the one hand having circumferential segments 3a that lie within the outer circumference of the shaft, and on the other hand possessing circumferential segments 3b that lie outside the outer circumference of the shaft. The polygonal shape is provided for a three-point clamping; for two-point clamping, the inner contour can be of oval configuration. Annular element 2 has three approximately kidney shaped cavities 4 which each extend over a circumferential region of approximately 1000 and are introduced into hollow body 2 by, for example, an electrodischarge machining or milling operation.

To create a joint between the shaft and annular element 2, radial compressive forces F are exerted on annular element 2 from outside, the force application points being selected so that the working lines of forces F run approximately centeredly through cavities 4. As a result of compressive forces F, annular element 2 is pressed radially inward in the region of the force application points, and at the same time the regions located centeredly between the force application points—i.e. those circumferential segments 3a that, in the unclamped state, lie inside the outer contour of the shaft and thus prevent insertion of the shaft into annular element 2—are elastically deformed radially outward, so that the inner contour assumes a round shape as depicted in FIG. 2. The radial movement of circumferential segments 3a creates the space that is necessary so that the shaft can be inserted into annular element 2 or pulled back out of hollow body 2.

When the radial compressive forces are then reduced or discontinued. annular element 2 deforms elastically back again, with the result that circumferential segments 3a move back inward again and press with the elastic return force against the inner wall of the shaft, thus forming a press fit.

If a [hollow shaft is to be clamped externally with the] hollow body is to be clamped inside a hollow shaft, the recesses open toward the outer circumference of the hollow body and the radial compressive forces are applied onto the hollow body from the inner side. The result of this is that the body segments that arc formed between the opening regions are pulled inward into the region of the recesses, so that the hollow body can be inserted into the hollow shaft. In this case as well, the radial movement of the body segments takes place substantially without deformation of the external effective circumferential contour, which correspondingly has, in the unclamped state, a circular shape whose diameter is somewhat greater than the inside diameter of the hollow shaft.

Figure 3:
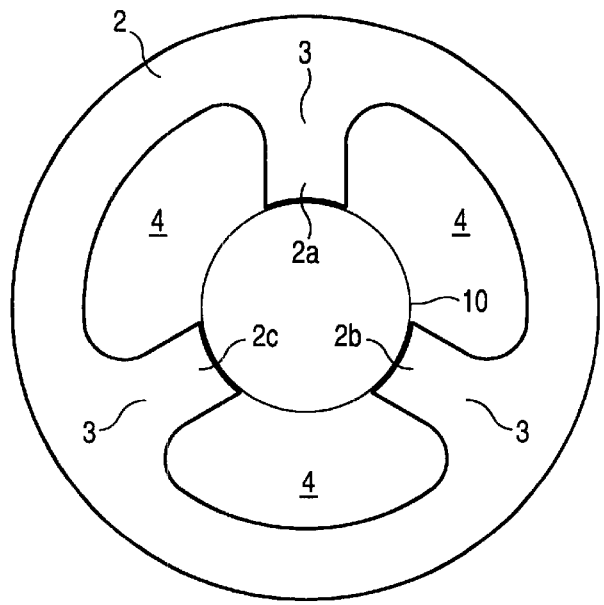
FIG. 3 shows a second embodiment of a joining system according to the present invention for clamping a shaft, in the clamped state.
Figure 4:
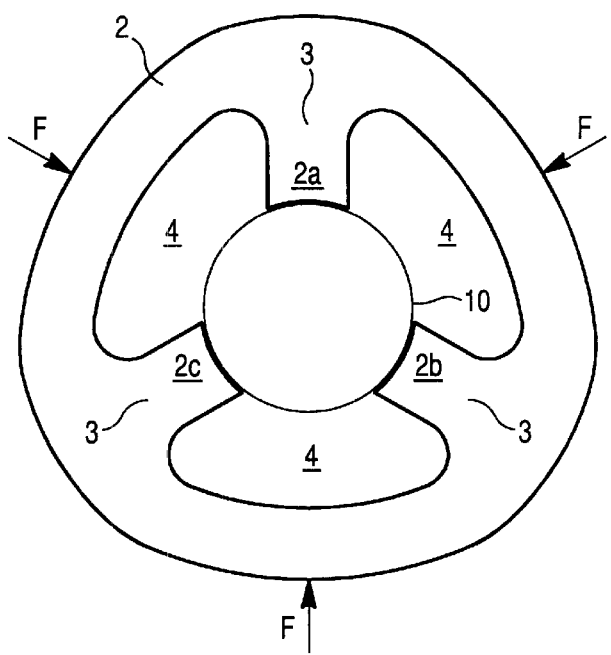
FIG. 4 shows the joining system of FIG. 3 in the fitting and/or released state.

FIGS. 3 and 4 depict a second embodiment of a joining system configured according to the present invention. This joining system comprises a round shaft 1 and a hollow body, in the form of an annular element 2, fastened on shaft 1. Annular element 2 has a circular inner and outer contour, the diameter of the inner contour being slightly less than the diameter of shaft 1, i.e. the inner contour lies entirely within the outer contour of shaft 1. Annular element 2 has three cavities in the form of groove-like recesses 4, which each extend over a circumferential region of approximately 100° and are open toward the inner circumference of annular element 2, so that only narrow web regions 3 remain between them.

To release—or conversely—to create—the joint depicted in FIG. 2 between shaft 10[1] and annular element 2, radial compressive forces F are exerted on annular element 2 from outside, the force application points being selected so that the working lines of forces F run approximately centeredly through the opening regions of recesses 4. As a result of compressive forces F, annular element 2 is elastically deformed radially inward in the region of the force application points, and at the same time radially outward in the circumferential regions located approximately centeredly between the force application points, in which web regions 3 also lie. Annular segments 2a, 2b, 2c are thereby also moved radially outward—for which recesses 4 allow the necessary space—but are deformed only insignificantly or not at all. As a result of the radial movement of annular segments 2a, 2b, 2c, their effective inner contours release from shaft 10[1] so that the latter can be pulled out of annular element 2.

Figure 5:
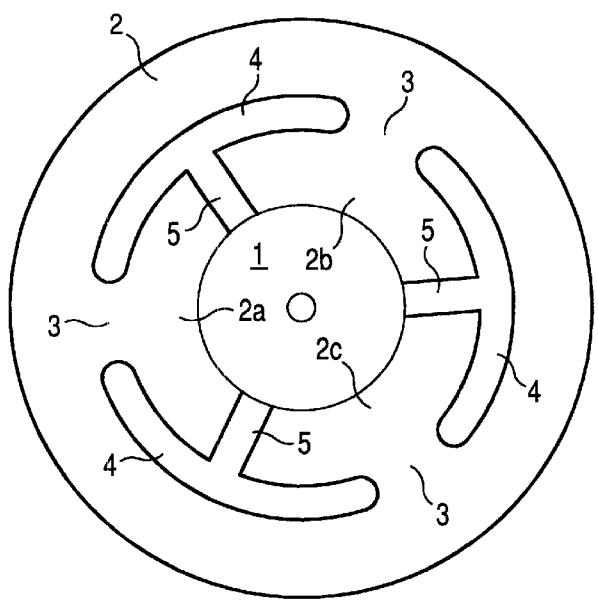
FIG. 5 shows a third embodiment of a joining system according to the present invention for clamping a shaft, in the clamped state.
Figure 6:
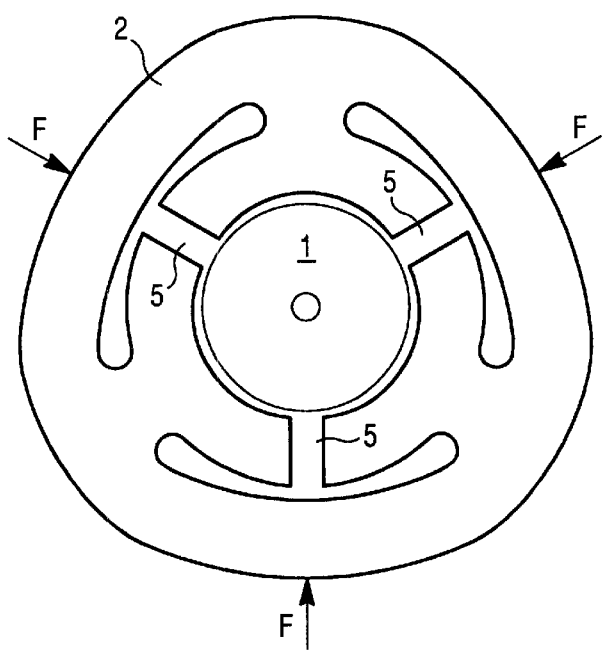
FIG. 6 shows the joining system of FIG. 5 in the fitting and/or released state.

FIGS. 5 and 6 depict a third embodiment of a joining system according to the present invention which has the same basic configuration as the joining system explained above and depicted in FIGS. 1 and 2. All that is different is the configuration of recesses 4, which in the second embodiment are configured as comparatively narrow slots which extend along the center diameter of annular element 2 and open toward the inner contour by way of three radial groove-like slits 5 that each proceed centeredly, viewed in the circumferential direction, radially inward from recesses 4 and correspondingly have an angular offset of 120° from one another.

This results in the formation of three annular segments 2a, 2b, 2c, which are each delimited in the circumferential direction by two of slits 5 and toward the outside by recesses 4, and are joined to the remaining annular elements 2 by web regions 3 located between recesses 4. Recesses 4 and radial slits 5 can be electrodischarge machined or otherwise introduced into annular element 2.

Figure 7:
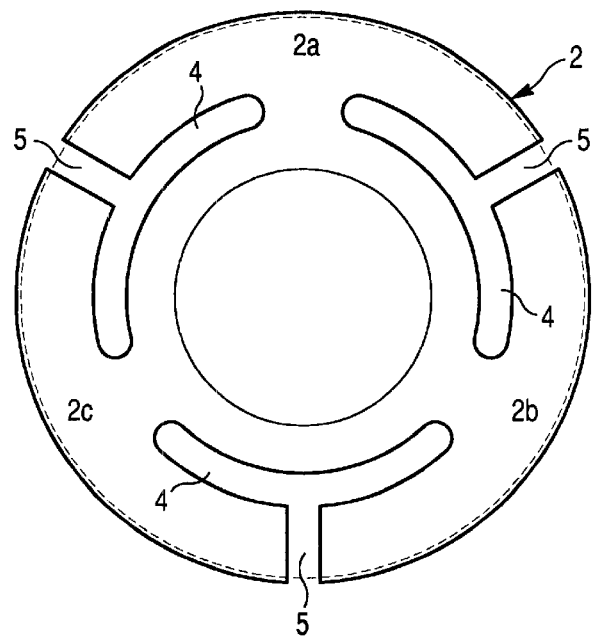
FIG. 7 shows the deformable component of a further embodiment of a joining system configured according to the present invention for external clamping of workpieces, in the unloaded state.
Figure 8:
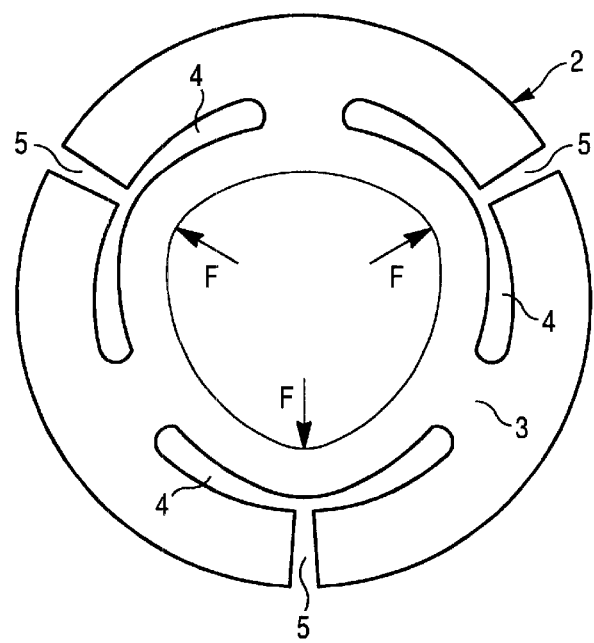
FIG. 8 shows the deformable component of FIG. 7 in the loaded state.

FIGS. 7 and 8 depict a hollow body, configured as an annular element 2, of a further joining system according to the present invention with which a hollow body (not depicted), for example a hollow shaft, can be externally clamped. As in the case of the first exemplary embodiment, annular element 2 has recesses 4 that each extend over approximately 1000 in the circumferential direction along the center radius of annular element 2, so that narrow web regions 3 remain between them. A slit 5 extends radially outward from each recess 4; the slits proceed, when viewed in the circumferential direction, approximately centeredly from recesses 4, so that they each have an angular offset of 1200 from one another. The outer circumference of annular element 2 is selected so that it is somewhat smaller than the inner circumference of the workpiece that is to be clamped. When annular element 2 is then to be immobilized in the workpiece, compressive forces F are exerted, as indicated in FIG. 6, on annular element 2 on the inner circumference engaging in such a way that their working lines F run approximately centeredly through slits 5. As a result of the radial compressive forces F, annular element 2 is deformed outward on the inner circumference in the region of the force application points, for which recesses 5 leave the necessary space, and at the same time the annular element is elastically deformed inward approximately centeredly between the force application points so that annular segments 2a, 2b, 2c are pulled inward, for which recesses 4 also offer the necessary room (FIG. 8).

Since no direct forces act on annular segments 2a, 2b, 2c, they experience only a radial movement but otherwise essentially no deformation; recesses 5 and slits 5 simply become somewhat smaller. The application of force thus decreases the outside diameter of annular element 2 so that it can be inserted into the workpiece that is to be clamped when the radial compressive forces are then reduced or discontinued, annular element 2 elastically deforms back, with the consequence that its diameter increases again and annular segments 2a, 2b, 2c push with the elastic return force against the inner wall of the workpiece, thus forming a press fit.

What is claimed is:

1. A method for creating a releasable joint between two components, in which one of the components is elastically deformed by radial compressive forces in such a way that its effective inner circumferential contour corresponds to an effective outer circumferential contour of the other component with a predefined clearance, so that the two components can be inserted one into the other thereby fitting them together; and in which, after the two components have been fitted together, a compressive joint is created by the fact that the deformed component is elastically deformed back by reducing or discontinuing the radial compressive forces, the method comprising the steps of providing a hollow body as the elastically deformable component having multiple cavities in its wall; and exerting the radial compressive forces on one effective circumferential contour of the hollow body located opposite the effective inner circumferential contour in such a way that working lines of the radial compressive forces, considered in the circumferential direction, run approximately centeredly through the cavities.

2. The method as defined in claim 1, wherein the radial compressive forces are exerted on the hollow body in a manner uniformly distributed over the outer circumference.

3. The method as defined in claim 1, wherein the hollow body used is one whose cavities are closed toward the effective inner circumferential contour, the effective inner circumferential contour having, in the undeformed state, circumferential segments lying inside and outside the effective outer circumferential contour of the other component.

4. The method as defined in claim 3, wherein the hollow body used is one whose effective inner circumferential contour has a polygonal or oval basic shape.

5. The method as defined in claim 3, wherein the hollow body used is one whose cavities are provided in the region of those circumferential segments which lie, in the unclamped state, outside the outer circumferential contour of the shaft that is to be clamped.

6. The method as defined in claim 1, wherein what is used as the elastically deformable component is a hollow body that has multiple cavities extending in the circumferential direction which, viewed in the circumferential direction, are open in their center region toward the effective inner circumferential contour; and the radial compressive forces are exerted on the outer contour of the hollow body that lies opposite the effective inner circumferential contour in such a way that the working lines of the radial compressive forces lie in the opening regions of the cavities toward the effective inner circumferential contour, and thus the body segments formed between the opening regions are moved by the deformation substantially radially.

7. The method as defined in claim 6, wherein what is used is a hollow body whose effective inner contour lies, in the unclamped state, entirely inside the outer circumferential contour of the shaft that is to be clamped.

8. A joining system having first and second components to be joined, in which the first component is elastically deformable by radial compressive forces in such a way that its effective inner circumferential contour corresponds to the corresponding effective outer circumferential contour of the second component with a predefined clearance, so that the second component can be inserted into the first component thereby fitting them together; and in which, after the first and second components have been fitted together, a compressive joint is created by the fact that the first component is elastically deformed back by reducing or discontinuing the radial compressive forces, wherein the elastically deformable component is a hollow body that has multiple cavities in its wall extending over at least 200° in the circumferential direction and separated from one another only by narrow web regions.

9. The joining system as defined in claim 8, wherein the hollow body has three cavities which each extend over a circumferential region of 80 to 100° and are arranged uniformly distributed over the circumference of the hollow body.

10. The joining system as defined in claim 8 wherein said cavities extend over approximately 200° to 300° in the circumferential direction and are separated from one another only by narrow web regions.

* * * * *